United States Patent
Frisch et al.

(10) Patent No.: US 11,271,654 B2
(45) Date of Patent: Mar. 8, 2022

(54) REPEATER POWERING (71) Applicant: Neptune Subsea IP Limited, London (GB)

(72) Inventors: David Antony Frisch, Ashbourne (GB); Alistair Hill, Leybourne (GB)

(73) Assignee: Neptune Subsea IP Limited, London (GB)

( * ) Notice: Subject to any disclaimer, the term of this patent is extended or adjusted under 35 U.S.C. 154(b) by 0 days.

(21) Appl. No.: 17/011,511

(22) Filed: Sep. 3, 2020

(65) Prior Publication Data

US 2020/0403699 A1 Dec. 24, 2020

Related U.S. Application Data

(63) Continuation of application No. PCT/GB2019/050623, filed on Mar. 6, 2019.

(30) Foreign Application Priority Data

Mar. 6, 2018 (GB) .................................... 1803541
Jan. 24, 2019 (GB) .................................... 1900996

(51) Int. Cl.
*H04B 10/293* (2013.01)
*H04B 10/80* (2013.01)
*H04B 10/564* (2013.01)

(52) U.S. Cl.
CPC ......... *H04B 10/293* (2013.01); *H04B 10/564* (2013.01)

(58) Field of Classification Search
CPC ........................... H04B 10/293; H04B 10/808
See application file for complete search history.

(56) References Cited

U.S. PATENT DOCUMENTS

| | | | | |
|---|---|---|---|---|
| 5,054,876 A | * | 10/1991 | Grasso | H04B 10/2931 385/24 |
| 2002/0080447 A1 | * | 6/2002 | Fells | H04B 10/2935 398/105 |
| 2002/0089316 A1 | | 7/2002 | Liu | |
| 2003/0063641 A1 | * | 4/2003 | Johnson | H01S 5/40 372/38.04 |
| 2009/0028566 A1 | * | 1/2009 | Abbott | H04B 10/0791 398/83 |
| 2018/0269990 A1 | * | 9/2018 | Muth | H04B 10/524 |

FOREIGN PATENT DOCUMENTS

EP 1357679 A1 10/2003
JP S57-194646 A 11/1982

OTHER PUBLICATIONS

International Search Report and Written Opinion of the International Searching Authority in connection with International Patent Application No. PCT/GB2019/050623 dated May 29, 2019, 10 pages.

\* cited by examiner

*Primary Examiner* — Nathan M Cors (57) ABSTRACT

An optical repeater is disclosed, comprising: an optical input port for receiving an input optical signal; an optical output port for transmitting an output optical signal; electronics comprising an amplifier configured to increase a signal level of the optical signal between the input port and the output port; a voltage regulator configured to provide a variable voltage power supply to the electronics, and optionally comprising a local or external controller configured to determine a supply voltage in response to demand and to control the voltage regulator to provide the supply voltage.

20 Claims, 6 Drawing Sheets

REPEATER POWERING

CROSS-REFERENCE TO RELATED APPLICATIONS AND PRIORITY CLAIM

This application claims priority as a continuation of International Patent Application No. PCT/GB2019/050623 filed on Mar. 6, 2019, which claims priority to United Kingdom Patent Application No. 1803541.0 filed on Mar. 6, 2018 and United Kingdom Patent Application No. 1900996.8 filed on Jan. 24, 2019. All of these applications are hereby incorporated by reference in their entirety.

TECHNICAL FIELD

This disclosure relates generally to optical communication systems. More specifically, this disclosure relates to improved repeater powering.

BACKGROUND

Optical communication networks are often used to transport large amounts of data over long distances very quickly. At present, sophisticated optical communication networks are capable of transmitting tens of trillions of bits of information per second over a single optical fiber spanning many hundreds of kilometers. Optical communication networks generally exceed the bandwidth capabilities of copper networks. As a result, optical networks are often used to form undersea telecommunication networks and to form optical backbones in wireline telecommunication networks.

Optical signals propagating in optical fibers will be subject to attenuation. In order to establish an optical communication link between terminals that are separated by a very long distance, it is therefore necessary to include repeaters with electrically powered amplifiers in the link that are configured to increase the optical power of the signals.

Providing electrical power to repeaters is not easy, because they may be positioned at great distances from any electrical power source (e.g. in a subsea communication link). The electrical power sources are typically located one or both ends of the communication link. A typical subsea cable may include a conductor with a resistance of around 1 ohm/km. A minimum current is necessary in the cable in order to provide the required power to the repeaters. A significant amount of voltage will be dropped in such a cable—subsea systems can be thousands of kilometers long. The voltage applied to the cable will have to both overcome this cable resistance and provide sufficient voltage across each repeater.

A repeater typically has a specified minimum voltage and current requirement that is chosen to ensure operation under all anticipated conditions. In specifying these power supply requirements, variations between pump lasers may need to be taken into account. Ageing effects tend to increase power dissipation over time, and higher temperatures also tend to mean higher power dissipation (for a given amount of amplification). For a repeater at the beginning of its operational life and/or in cold water, the available voltage under the specified (worst case) power supply conditions may be more than is required.

The maximum voltage that can be applied to the cable depends on the insulating properties of the cable, but 15 kV is typically an upper limit. The need to provide electrical power to repeaters can be a significant constraint on the capacity and/or unregenerated length of subsea communication systems.

SUMMARY

According to a first aspect of the present disclosure there is provided an optical repeater, comprising: an optical input port for receiving an input optical signal; an optical output port for transmitting an output optical signal; electronics comprising an amplifier configured to increase a signal level of the optical signal between the input port and the output port; and a voltage regulator configured to provide a variable voltage power supply to the electronics.

The power regulator may comprise an adjustable shunt regulator.

The adjustable shunt regulator may comprise a shunt transistor providing a current bypass, parallel with the electronics.

The adjustable shunt regulator may further comprise an adjustable voltage reference arranged to control the gate voltage of the shunt transistor in response to a control signal. The adjustable regulator may comprise a Zener diode and an adjustable voltage divider.

The adjustable shunt regulator may further comprise a feedback loop, the feedback loop configured to be responsive to the voltage across the electronics and to control the gate voltage of the shunt transistor.

The adjustable shunt regulator may comprise a switched regulator comprising a series combination of regulator diodes, and at least one electrically controlled regulator switch; wherein each electrically controlled switch is connected in parallel with a respective regulator diode so that the respective regulator diode is bypassed by the regulator switch is closed.

The voltage regulator may comprise a regulator controller configured to set the regulator voltage provided to the electronics in response to a voltage control signal.

The electronics may comprise at least one sensor configured to measure operating parameters of the electronics. The electronics may comprise a controller configured to determine a supply voltage in response to demand (for instance, as indicated by the parameters). Alternatively, a controller that is external to the repeater may determine a supply voltage in response to demand (e.g. as indicated by the operating parameters determined at least one sensor).

The controller may be configured to provide the voltage control signal to the regulator controller in response to the operating parameters.

The operating parameters may comprise a current or a power consumed by a component of the electronics.

The component of the electronics may comprise at least one of: a pump laser diode and a Peltier cooler.

The operating parameters may comprise an output optical power of a pump laser diode.

The operating parameters may comprise a temperature of the electronics.

The voltage regulator may be configured to receive a remotely provided command setting a supply voltage to be provided to the electronics.

The optical repeater may be configured to set the supply voltage provided by the voltage regulator autonomously.

The optical repeater may be a submarine optical repeater.

According to a second aspect, there is provided an optical system, comprising an optical communication link comprising: a plurality of repeaters each separated by a span of cable that comprises optical fibers; and a power supply configured to provide a system voltage and current to the optical communication link that is sufficient to power each of the repeaters; wherein at least some of the repeaters are improved repeaters according to the first aspect.

The optical system may further comprise a controller external to the at least one improved repeater configured to determine a supply voltage for each of the at least one improved repeater, and to set at least one of the system voltage and the system current.

The controller may be configured to determine the supply voltage for each of the repeaters by communicating with each of the at least one improved repeater according to the first aspect.

The controller may be configured to set the system voltage and/or system current based on the supply voltage for each of the at least one improved repeater.

The controller may be configured to set the system current such that a voltage dropped in the cable substantially equals a voltage dropped over the repeaters (all the repeaters, including both improved repeaters and otherwise).

According to a third aspect, there is provided a method of powering an optical repeater, comprising using a voltage regulator to set a variable voltage supplied to a load of the repeater, the load comprising an optical amplifier that increases a signal level of an optical signal.

The optical repeater may be according to the first aspect.

According to a fourth aspect, there is provided a method of powering an optical system comprising a plurality of repeaters each separated by a span of cable that comprises optical fibers, comprising: providing a system voltage and current to the optical communication link that is sufficient to power each of the repeaters; and adjusting the voltage dropped over each of the repeaters based on parameters measured at the repeater.

The repeater may be according to the first aspect and/or the system may be according to the second aspect.

Any of the features of any aspect (optional or otherwise) may be combined with any of the features of any other aspect.

BRIEF DESCRIPTION OF THE DRAWINGS

Embodiments will now be described, purely by way of example, with reference to the accompanying drawings, in which.

DETAILED DESCRIPTION

Embodiments according to this disclosure may reduce the power needed for a system where a number of elements derive their power from a current which passes from one to the next (i.e. there is a series connection between the elements, with a common current through each element, and the power is the current multiplied by the voltage dropped over each element). A subsea cable system is an example of this, in which elements (e.g. repeaters) are interconnected in series and powered by a common current. The internal circuitry of each repeater consumes electrical power, the amount of which varies depending on component ageing, temperature changes, etc. In prior art systems, a voltage regulator provides a fixed voltage drop over each repeater which is sufficient to provide the power required under worst case conditions. This approach means that many of the repeaters will be consuming more power than required. In embodiments, an electrical circuit is provided (such as an adjustable shunt regulator) which is adjusted so that the power consumed by the repeater is more closely matched to the power required by the repeater.

Figure 1:
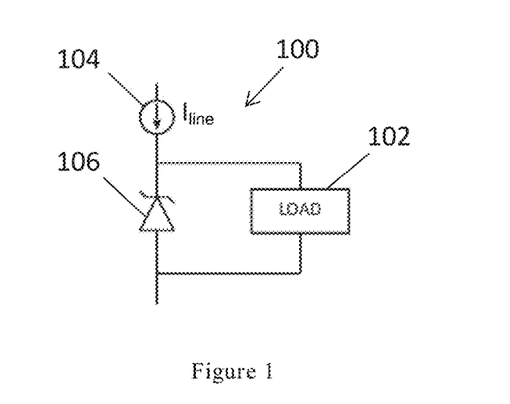
FIG. 1 is an schematic diagram of a prior art voltage regulator for a repeater.

Referring to FIG. 1, a conventional prior art repeater 100 is shown, comprising electronics 102 and a Zener diode 106 for ensuring that a fixed voltage is provided to the electronics 102. The electronics 102 represents powered components of the repeater, including (for example) pump laser diodes for powering optical amplifiers.

The repeater 100 will typically be one of several that are arranged along a cable. The repeater 100 will be powered by current flowing through the cable, represented here by current source 104. A voltage across the Zener diode 106 above its threshold voltage will cause it to break down and allow current to flow until the voltage is equal to the threshold voltage. The voltage across the load 102 is therefore held at the threshold voltage of the Zener diode 106, with excess current shunted through the Zener diode 106. When the load 102 requires a small amount of current, more current will pass through the Zener diode 106. The voltage dropped across the repeater 100 is fixed.

Figure 2:
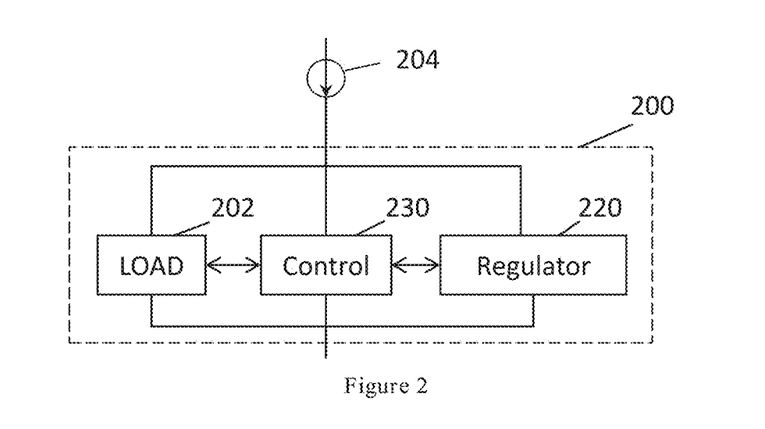
FIG. 2 is a schematic diagram of a repeater according to an embodiment.

FIG. 2 shows a repeater 200 according to an embodiment, comprising electronics 202, a voltage regulator 220 and controller 230. The repeater 200 is configured to be powered by a current through a cable, represented by current source 204. Rather than regulating the voltage at the electronics 202 to a fixed value, the regulator 220 is configured to provide a variable voltage across the electronics 202 and controller 230 in response to a control signal from the controller 230.

The controller 230 may be configured to adjust the voltage across the load 202 in response to external commands (e.g. provided via the cable from equipment external to the repeater), or based on parameters of the repeater. For example, the electronics 202 may include sensors that monitor the demand for power in the electronics 202. The controller 230 may respond to signals from these sensors to increase the voltage across the electronics 202 (by decreasing current flow through the regulator, thereby increasing current flow through the electronics 202).

The electronics 202 may include sensors for monitoring the optical power of a pump laser or a temperature of the electronics. The electronics 202 may send signals to the controller 230 indicating the optical power of a pump laser and/or a temperature of the electronics 202. The controller 230 may be configured to determine what voltage should be provided by the regulator 220 in response to these signals.

For example, a repeater 200 in deep water may be held at a suitable temperature by the ambient water, which will typically be at a low temperature. A repeater 200 in warm water may need to be actively cooled (e.g. by a Peltier cooler), which will increase the amount of power required by the repeater. The control electronics 230 may respond to a temperature signal that indicates active cooling is required by increasing an amount of voltage supplied to the electronics 202, so that enough power is available to power the active cooling (as well as power the pump lasers). The pump lasers may function less efficiently at an elevated temperature, and more power may similarly be required to compensate for this. Monitoring the output power of the pump lasers may enable compensation of degradation in efficiency (e.g. due to aging), while always dropping the minimum necessary voltage over the repeater. The reduced voltage drop at a repeater may enable enhanced performance, lifetime and reliability for the system as a whole, by reducing the maximum voltage that must be applied to the cable in order to power the system and by reducing the temperature of the repeater electronics (due to lower power consumption).

The variable voltage regulator 220 can be implemented in any suitable way.

Figure 3:
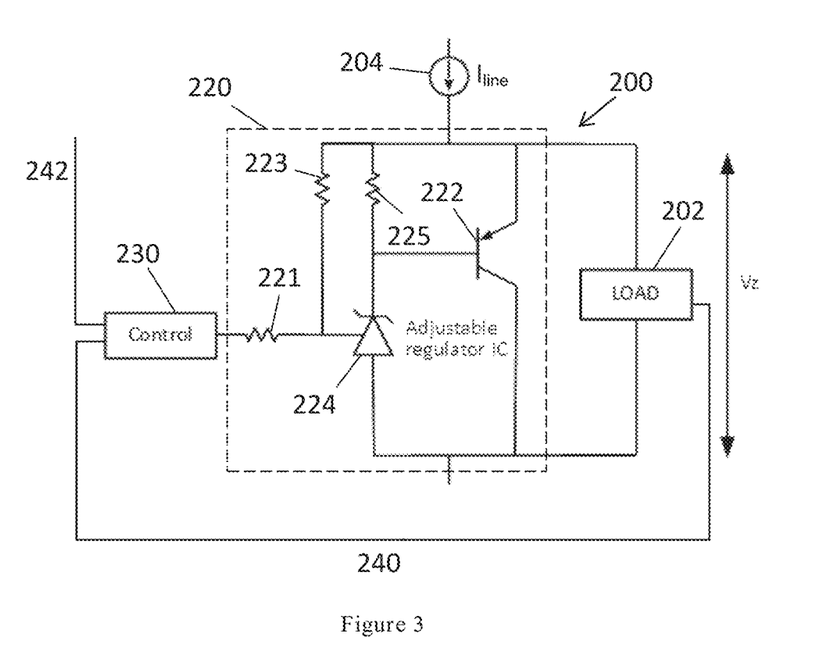
FIG. 3 is an example embodiment of a repeater with a variable voltage power regulator using a shunt transistor.

FIG. 3 shows a repeater 200 comprising electronics 202, voltage regulator 220 and controller 230. The voltage regulator 202 in this embodiment comprises a shunt transistor 222 through which current is shunted past the load 202. The shunt transistor 222 may be a PNP BJT transistor, with the emitter connected to the current source 204. The shunt transistor 222 is controlled by an adjustable Zener regulator 224 that provides an accurate voltage at the base of the shunt transistor 222. The voltage from the Zener regulator 224 is controlled by a signal from the controller 230 which is applied to the Zener regulator 224 via a potential divider comprising first and second resistors 221, 223. The first resistor 221 is connected between the controller 230 and the Zener regulator 224, and the second resistor 223 is connected between the Zener regulator 224 and the current source 204. The base of the shunt transistor 222 is connected to the output of the Zener regulator 224. The output of the Zener regulator 224 is connected to the current source 204 by a third resistor 225.

The controller 230 is configured to control the voltage provided to the Zener regulator 224, which will in turn determine the voltage at the base of the shunt transistor 222, the current flowing through the regulator 220 and the voltage across the load 202.

In all embodiments disclosed herein, the controller 230 may determine an appropriate control signal in response to signals 240 indicating an operating parameter of the load 202 and/or in response to external signals 242, which may be provided from an external controller (e.g. terminal equipment) via the cable. In some embodiments, the signals 240 indicating parameters of the load 202 may be provided to terminal equipment (e.g. a controller external to the repeater 200), the terminal equipment or external controller determining an appropriate supply voltage Vz to be applied to the load 202 by the regulator 220, and instructing the controller 230 accordingly.

Figure 4:
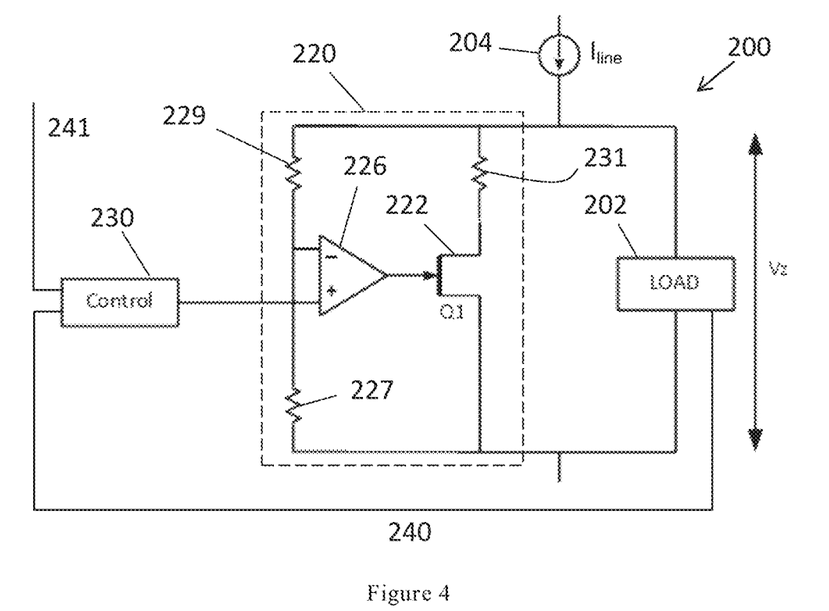
FIG. 4 is an example embodiment of a repeater with a variable voltage power regulator employing a shunt transistor controlled by a feedback signal.

FIG. 4 shows a repeater 200 with an alternative implementation for the regulator 220. The repeater 200 again comprises electronics 202, regulator 220 and controller 230. The regulator 220 in this example comprises a feedback loop which detects the voltage Vz across the load 202, and adjusts the bias voltage applied to a shunt transistor 222 to minimize the error between the voltage Vz and a desired voltage indicated by a control signal from the controller 230. The shunt transistor 222 may be a FET.

An op-amp 226 receives the control signal from the controller 230 at a non-inverting input. The voltage Vz is provided to a potential divider comprising first and second resistors 227, 229. The first resistor 228 is connected at one end to one side of the load 202 (opposite to the current source 204), and at the other end to the inverting input of the op-amp 226. The second resistor 229 is connected at one end to the inverting input of the op-amp 226 and at the other end to the current source 204. The central node of the potential divider therefore provides a voltage to the inverting input that is proportional to the supplied voltage Vz. An increased voltage Vz (relative to the desired voltage indicated by the output from the controller 230) will lead to an increase in the current flowing through the shunt transistor 222.

Figure 5:
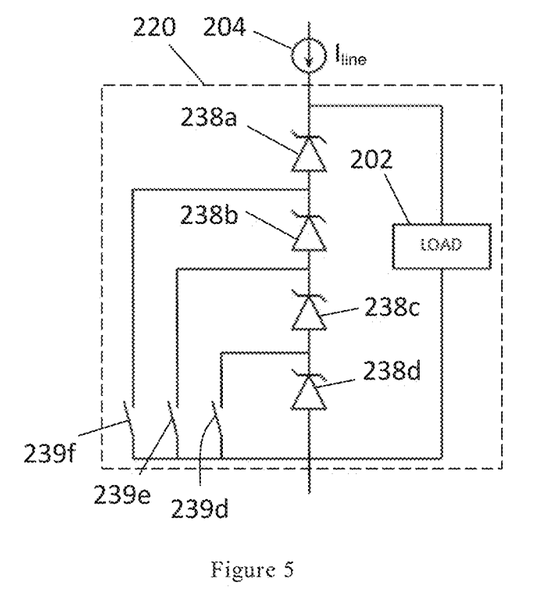
FIGS. 5 and 6 are an example embodiments of repeaters with a switched network of Zener diodes.

FIG. 5 shows an alternative embodiment of a repeater, comprising a switched network of Zener diodes 238a-d. Four Zener diodes are connected in series in this example, but an arbitrary number of Zener diodes can be used (in any appropriate network), depending on the range and resolution of control that is required (and the threshold voltage of each Zener diode). A network of switches 239d-f are provided in parallel with the Zener diodes 238a-d. Each of the switches 239d-f is configured to bypass at least one of the Zener diodes 238a-d, effectively reducing the number of Zener diodes 238a-d that are connected in series. In this example, a first switch 239d is configured to bypass only diode 238d, a second switch 239e is configured to bypass diodes 238d and 238c, and a third switch 239f is configured to bypass three diodes 238b-c. Closing one or more switch 239e-f therefore adjusts the voltage across the load 202. For example, when switch 239f is closed, the voltage across the load 202 is equal to the threshold voltage of diode 238a. When switch 239e is closed (and switch 239f is open), the voltage across the load 202 is equal to the sum of the threshold voltages of diodes 238a and 238b.

Figure 6:
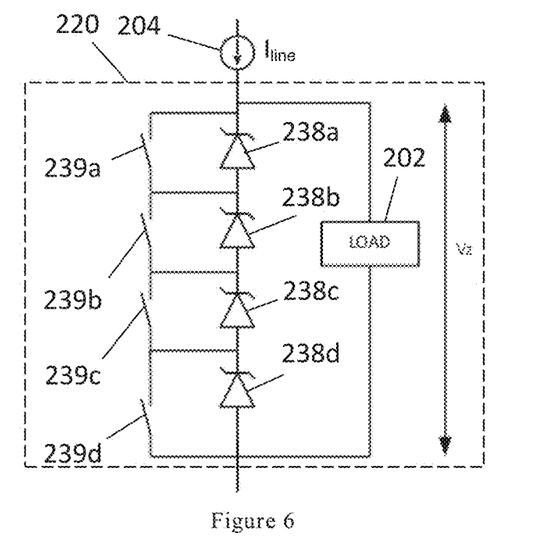

FIG. 6 shows an arrangement that is similar to that of FIG. 5, but each switch 239a-d in this embodiment is configured to bypass only a single diode 238a-d.

In the examples above, the threshold voltage of each (or some) of the Zener diodes 238a-f may be different. For example, any of the Zener diodes may comprise a series combination of Zener diodes. The Zener diodes and switches may be configured to form a weighted network (e.g. a binary weighted network), so that a wider range of voltages may be easily selected.

For simplicity of depiction, the controller 230 is not shown in FIGS. 5 and 6, but the switches 239a-f may be controlled by signals from a controller 230, as described above.

In some embodiments, the switched Zener diode network may be replaced with a switched resistor network—the shunt resistance may be configured to have a resistance that apportions current to achieve similar voltage regulation.

Figure 7:
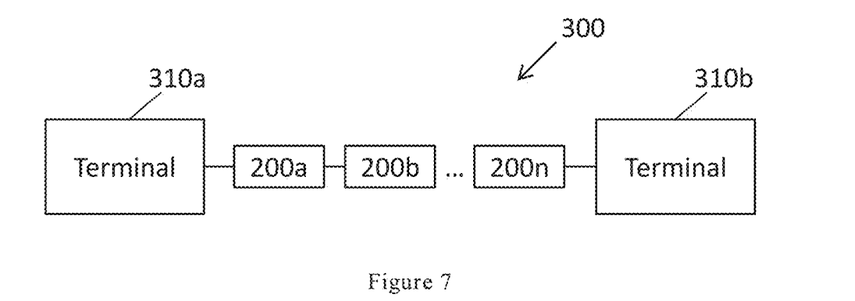
FIG. 7 is a schematic of a system comprising an optical communications link comprising a plurality of repeaters.

FIG. 7 shows an optical system 300, comprising a first terminal 310a, second terminal 310b, and an optical communication link connecting the first terminal 310a to the second terminal 310b.

The optical communication link comprises an optical cable with repeaters 200a-n spaced apart along its length. The repeaters 200a-n are configured to regenerate optical signals carried between the first and second terminal 310a, 310b by the optical cable, and comprise amplifiers that increase the signal level of optical signals at each repeater 200a-n. The first and second terminals 310a, 310b comprise a system power source, for causing current to flow down the cable so that the repeaters 200a-n receive electrical power.

Figure 8:
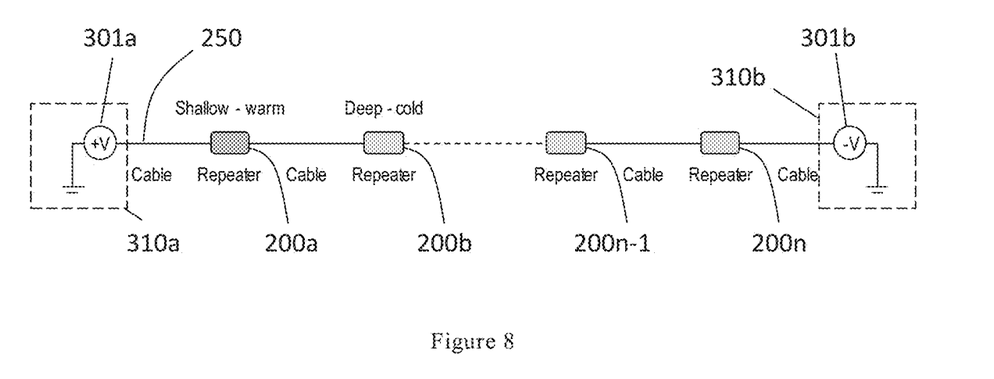
FIG. 8 is a further schematic of a system according to an embodiment.

FIG. 8 is a further illustration of such a system, in which the system power source in each terminal is represented by a positive voltage source 301a and a negative voltage source 301b. This balanced powering arrangement may be advantageous, but is not essential, and the cable can be powered from one end only in some embodiments. It is conventional to power repeaters on long submarine cables using DC power, with the repeaters powered in series. This means that each repeater receives the same current.

Some of the repeaters (200a in this example) may be placed in relatively warm water, for instance in shallow and/or inshore waters. A repeater in warm environment may require active cooling in order to maintain an appropriate temperature (e.g. for efficient laser diode operation). Without active cooling pumps lasers generally require more current to produce the same optical power For these reasons repeaters in warm water generally require more power.

Prior art repeaters are designed to run from a fixed voltage, and include a fixed voltage regulator to provide this. The available power to each repeater will be the product of the fixed voltage and the current flowing through the cable. If the repeater does not need all the available power, the excess will be dissipated in the voltage regulator. With this fixed voltage, the regulation must be set to provide sufficient voltage to each repeater to provide the worst case amount of power—for instance, enough to provide active cooling to a repeater in warm water, subject to degraded efficiency due to aging.

The below table illustrates the advantages that can be achieved by using repeaters according to an embodiment. Assuming a distance between terminals of 6000 km, and a spacing between repeaters of 90 km, 65 repeaters would be required, 3 of which would be in warm water. The calculation assumes that each repeater comprises 6 amplifiers. A repeater in warm water is assumed to require 20 W, and a repeater in cool water is assumed to require 12 W. In an optical system comprising conventional repeaters, the voltage regulation at each repeater must be based on the maximum required power and the anticipated current through the cable (e.g. 0.8 A). The cable resistance is assumed to be 1 ohm/km, so the voltage dropped over the cable is the current×6000 (4800V for 0.8 A).

Case A illustrates the prior art situation. The power supply for each repeater must be able to provide the worst case power of 20 W. This translates to a repeater voltage of 150V (Power/Current). The total repeater voltage is 65×150V=9750V. The total voltage drop is therefore 14550V (the sum of the repeater and cable voltage drops). This is at the edge of the specified maximum for typical cables (15 kV), and is likely to result in accelerated wear compared to a lower voltage.

| Case | A | B | C |
|---|---|---|---|
| System Length (km) | 6,000 | 6,000 | 6,000 |
| Amplifier spacing (km) | 90 | 90 | 90 |
| Amplifiers | 65 | 65 | 65 |
| Number of pairs | 6 | 6 | 6 |
| Current (A) | 0.8 | 0.8 | 0.90 |
| Worst case amplifier power (W) | 20 | 20 | 20 |
| Number involved | 65 | 3 | 3 |
| Repeater voltage (V) | 150 | 150 | 134 |
| Deep water power (W) | N/A | 12 | 12 |
| Number involved | N/A | 62 | 62 |
| Repeater voltage (V) | N/A | 90 | 80 |
| Cable resistance (ohm/km) | 1 | 1 | 1 |
| Cable voltage (V) | 4,800 | 4,800 | 5,380 |
| Repeater voltage (V) | 9,750 | 6,030 | 5,380 |
| Total voltage (V) | 14,550 | 10,830 | 10,760 |

Case B represents a system with repeaters according to an embodiment. The three repeaters that are in warm water are provided with 150V, and the 62 repeaters that are in cold water are provided with a voltage of 90V, which is sufficient to provide the required 12 W of power under these circumstances. This results in a total required voltage of only 10830V, which is a considerable reduction over the prior art. This headroom can be used to extend the reach of the link, or to improve reliability and/or efficiency by operating at the reduced voltage.

Further improvements can be made by adjusting the current through the cable so that the voltage dropped over the repeaters matches the voltage dropped over the cable. Case C illustrates this: with a current of 0.9 A the voltages dropped over the repeaters and the cable are equal, with the result that the total (system) voltage is minimized (at 10760V).

Figure 9:
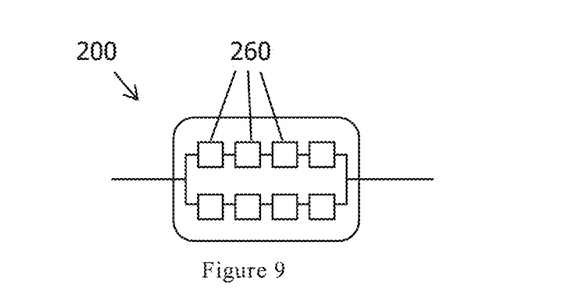
FIG. 9 is a schematic of a repeater comprising a number of modules.

As shown in FIG. 9, each repeater 200 may comprise a number of modules 260. Each module 260 comprises at least one amplifier (e.g. a pair of amplifiers to amplify signals in westward and eastward directions) and associated electronic circuitry (e.g. for powering pump sources, active cooling and controllers). Modules 260 in repeaters may be connected together in series or in parallel, or in some combination of series and parallel, as illustrated in FIG. 9.

The voltage regulation arrangements 220 described herein may be applied to at least some (or all of) the modules 260 in a repeater (e.g. module level control), to groups of modules 260 (e.g. group level control) or to the ensemble of modules 260 in a repeater 200 (e.g. repeater level control of voltage regulation), or to at least one (e.g. all of) the modules 260 that comprise the repeater 200.

Figure 10:
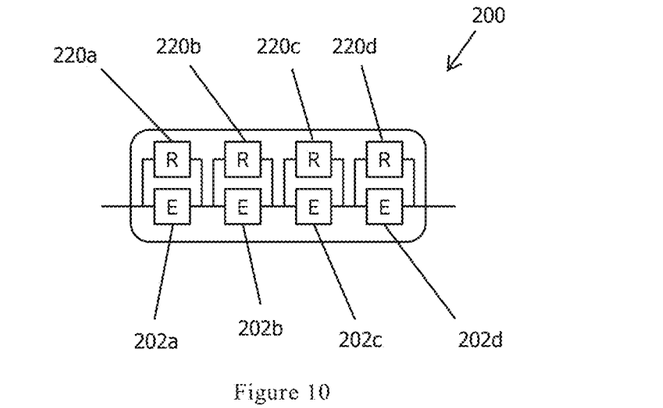
FIG. 10 is an example of module level voltage control.

FIG. 10 illustrates an example of module level control (in this case for a series combination of modules), each module comprising a voltage regulator 220a-d and electronics 202a-d for powering and/or controlling an optical amplifier.

Figure 11:
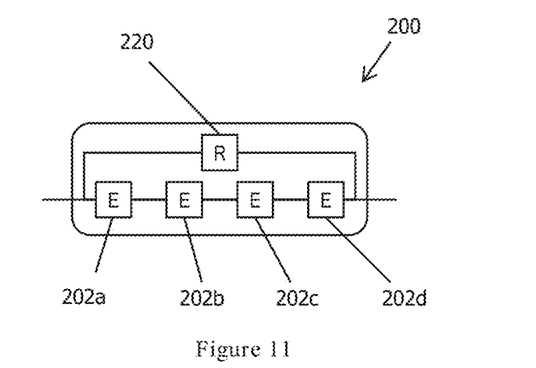
FIG. 11 is an example of repeater level voltage control.

FIG. 11 illustrates an example of repeater level control. In this case a series combination of loads 220a-d is regulated by a single regulator 220.

Figure 12:
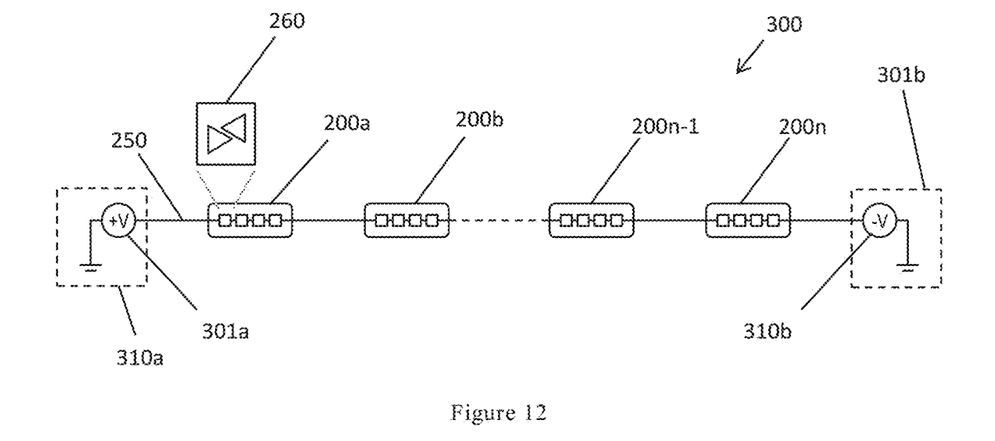
FIG. 12 is an optical system, showing modules in each repeater.

FIG. 12 illustrates an optical system 300, similar to that shown in FIG. 7, in which the modules 260 of each repeater 200a-n are depicted. Although a series combination of four modules is shown, this is just an example (and parallel arrangements are also possible, as well as combinations of series and parallel arrangements).

Figure 13:
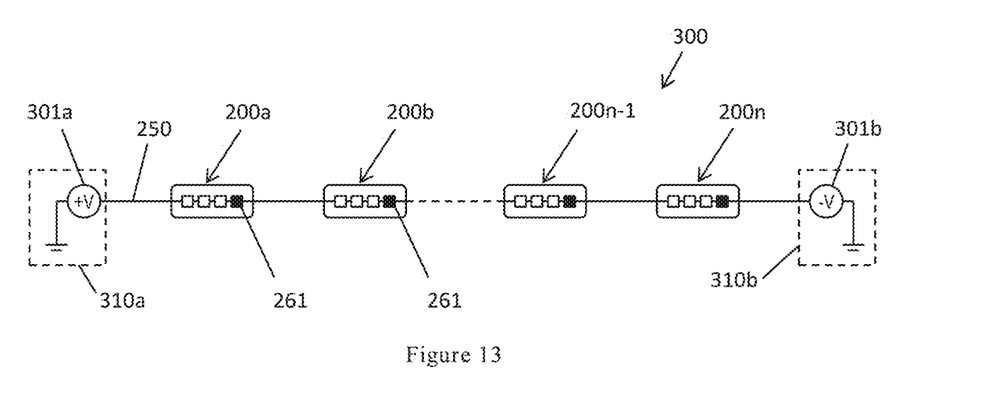
FIG. 13 is an optical system with a module of each repeater turned down/off.

Embodiments of the invention may be arranged to reduce the voltage provided to, and/or to turn off individual modules (or combinations of modules). In FIG. 13, each repeater comprises a non-powered module 261. The reduced powering for at least some of the modules in a repeater may be based on the operating conditions of the system 300. For example, in a fault condition, it may not be possible to provide sufficient electrical voltage to operate all the modules in each repeater. Aspects of the invention allow the system 300 to continue to operate in this scenario by selectively de-powering some of the modules 260 in at least some of the repeaters 200. For example, modules that perform the same function in each repeater (e.g. amplifying the same sub-set of channels or fibers) may be powered down in order to allow the system to continue to operate in a reduced bandwidth mode in a fault condition that might otherwise shut down the system 300.

In some embodiments, a system may be commissioned with fiber pairs that are not required to carry traffic in order to provide an appropriate bandwidth at the start of the system's life. De-powering these components until they are in demand both saves power and prolongs the life of the components of the system (since they are handling less power and/or are turned off).

In some embodiments, certain amplifiers in the system 300 may normally extend the system bandwidth (e.g. Raman pumps, or L-band amplifiers in a system using both C-band and L-band amplifiers). These amplifiers may be turned down or turned off in an initial system configuration by down-regulating the voltage provided to them, and later powered up to improve the bandwidth that can be handled by the system 300. In addition or alternatively, the amplifiers that normally extend system bandwidth may be turned down or turned off, and the voltage across their associated modules reduced, in order to allow the system 300 to continue to operate at reduced capacity during a fault condition where it is not possible to power the system at normal voltage.

In some embodiments, components may grouped in any way for power regulation. For example, the voltage regulation disclosed herein may be applied to one or more pumps, which are the main power consumers in most optical amplifiers, rather than at the level of amplifiers and/or modules.

In some embodiments, various functions described in this disclosure may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The description in the present application should not be read as implying that any particular element, step, or function is an essential or critical element that must be included in the claim scope.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. An optical repeater comprising:
an optical input port configured to receive an input optical signal;
an optical output port configured to transmit an output optical signal;
electronics comprising an amplifier configured to increase a signal level of the input optical signal between the input port and the output port;
a voltage regulator comprising an adjustable shunt regulator configured to provide a variable voltage power supply to the electronics to control a voltage dropped over the optical repeater; and
a controller configured to determine a supply voltage in response to demand and to control the voltage regulator to provide the supply voltage;
wherein the electronics further comprise at least one sensor configured to measure one or more operating parameters of the electronics; and
wherein the controller is configured to determine the demand in response to the one or more measured operating parameters.

2. The optical repeater of claim 1, wherein the one or more operating parameters comprise at least one of a current or a power consumed by a component of the electronics.

3. The optical repeater of claim 2, wherein the component of the electronics comprises at least one of: a pump laser diode or a Peltier cooler.

4. The optical repeater of claim 1, wherein the one or more operating parameters comprise at least one of:
an output optical power of a pump laser diode; or
a temperature of the electronics.

5. The optical repeater of claim 1, wherein at least one of:
the voltage regulator is configured to receive a remotely provided command setting the supply voltage to be provided to the electronics; or
the voltage regulator further comprises a regulator controller configured to set a regulator voltage provided to the electronics in response to a voltage control signal.

6. The optical repeater of claim 1, wherein the adjustable shunt regulator comprises a shunt transistor configured to provide a current bypass that is parallel with the electronics.

7. The optical repeater of claim 1, wherein the optical repeater is configured to set the supply voltage provided by the voltage regulator autonomously.

8. The optical repeater of claim 1, wherein the optical repeater is a submarine optical repeater.

9. An optical repeater comprising:
an optical input port configured to receive an input optical signal;
an optical output port configured to transmit an output optical signal;
electronics comprising an amplifier configured to increase a signal level of the input optical signal between the input port and the output port; and
a voltage regulator comprising an adjustable shunt regulator configured to provide a variable voltage power supply to the electronics to control a voltage dropped over the optical repeater;
wherein the voltage regulator comprises a regulator controller configured to set a regulator voltage provided to the electronics in response to a voltage control signal; and
wherein the electronics further comprise:
at least one sensor configured to measure one or more operating parameters of the electronics; and
a controller configured to:
determine a supply voltage in response to the one or more measured operating parameters; and
provide the voltage control signal to the regulator controller in response to the determined supply voltage.

10. An optical repeater comprising:
an optical input port configured to receive an input optical signal;
an optical output port configured to transmit an output optical signal;
electronics comprising an amplifier configured to increase a signal level of the input optical signal between the input port and the output port; and
a voltage regulator comprising an adjustable shunt regulator configured to provide a variable voltage power supply to the electronics to control a voltage dropped over the optical repeater;

wherein the adjustable shunt regulator comprises:
a shunt transistor configured to provide a current bypass that is parallel with the electronics; and
at least one of:
an adjustable voltage reference configured to control a gate voltage of the shunt transistor in response to a control signal; or
a feedback loop configured to be responsive to a voltage across the electronics and to control the gate voltage of the shunt transistor.

11. The optical repeater of claim 10, further comprising:
a controller configured to determine a supply voltage in response to demand and to control the voltage regulator to provide the supply voltage.

12. The optical repeater of claim 11, wherein:
the electronics further comprise at least one sensor configured to measure one or more operating parameters of the electronics; and
the controller is configured to determine the demand in response to the one or more measured operating parameters.

13. An optical repeater comprising:
an optical input port configured to receive an input optical signal;
an optical output port configured to transmit an output optical signal;
electronics comprising an amplifier configured to increase a signal level of the input optical signal between the input port and the output port; and
a voltage regulator comprising an adjustable shunt regulator configured to provide a variable voltage power supply to the electronics to control a voltage dropped over the optical repeater;
wherein the adjustable shunt regulator comprises a switched regulator comprising a series combination of regulator diodes and electrically-controlled regulator switches; and
wherein each electrically-controlled regulator switch is connected in parallel with a respective one of the regulator diodes so that the respective regulator diode is bypassed when the electrically-controlled regulator switch is closed.

14. An optical system comprising:
an optical communication link comprising a plurality of repeaters each separated by a span of cable that comprises one or more optical fibers, wherein each of at least one of the repeaters comprises:
an optical input port configured to receive an input optical signal;
an optical output port configured to transmit an output optical signal;
electronics comprising an amplifier configured to increase a signal level of the input optical signal between the input port and the output port; and
a voltage regulator comprising an adjustable shunt regulator configured to provide a variable voltage power supply to the electronics to control a voltage dropped over the repeater;
a power supply configured to provide a system voltage and a system current to the optical communication link that is sufficient to power each of the repeaters; and
a controller configured to determine a supply voltage for each of the at least one of the repeaters in response to demand and to control the voltage regulator of each of the at least one of the repeaters to provide the supply voltage;
wherein the electronics of each of the repeaters comprises at least one sensor configured to measure one or more operating parameters of the electronics of the repeater; and
wherein the controller is configured to determine the demand in response to the one or more measured operating parameters.

15. The optical system of claim 14, wherein the controller is external to the repeaters and is configured to set at least one of the system voltage or the system current.

16. The optical system of claim 14, wherein the controller is configured to determine the supply voltage for each of the at least one of the repeaters by communicating with each of the at least one of the repeaters.

17. The optical system of claim 3, wherein the controller is configured to at least one of:
set at least one of the system voltage or the system current based on the supply voltage for each of the at least one of the repeaters; or
set the system current such that a voltage dropped in the cable substantially equals the voltage dropped over the at least one of the repeaters.

18. A method of powering an optical repeater comprising:
using at least one sensor to measure one or more operating parameters of electronics of the optical repeater;
using a controller to determine a supply voltage based on a demand that is determined in response to the one or more measured operating parameters; and
using a voltage regulator to provide the supply voltage to the electronics of the optical repeater and thereby control a voltage dropped over the optical repeater;
wherein the electronics comprise an optical amplifier that increases a signal level of an optical signal.

19. The method of claim 18, wherein the optical repeater comprises:
an optical input port configured to receive the optical signal;
an optical output port configured to transmit an amplified optical signal;
the electronics comprising the optical amplifier; and
the voltage regulator, wherein the voltage regulator comprises an adjustable shunt regulator configured to provide a variable voltage power supply to the electronics to control the voltage dropped over the optical repeater.

20. The method of claim 18, wherein:
the optical repeater is one of a plurality of repeaters in an optical system, each repeater separated by a span of cable that comprises optical fibers; and
the method further comprises powering the optical system by:
providing a system voltage and a system current to the optical system that is sufficient to power each of the plurality of repeaters; and
adjusting the voltage dropped over each of the repeaters based on parameters measured at the respective repeater of each of the plurality of repeaters.

* * * * *

UNITED STATES PATENT AND TRADEMARK OFFICE
CERTIFICATE OF CORRECTION

| | |
|---|---|
| PATENT NO. | : 11,271,654 B2 |
| APPLICATION NO. | : 17/011511 |
| DATED | : March 8, 2022 |
| INVENTOR(S) | : David Antony Frisch et al. |

It is certified that error appears in the above-identified patent and that said Letters Patent is hereby corrected as shown below:

On the Title Page

Column 1, Item (30):
Line 1, "1803541" should read --1803541.0--; and
Line 2, "1900996" should read --1900996.8--.

Signed and Sealed this
Fourth Day of October, 2022

Katherine Kelly Vidal
*Director of the United States Patent and Trademark Office*